US008793678B2

(12) United States Patent
Tazzari et al.

(10) Patent No.: US 8,793,678 B2
(45) Date of Patent: Jul. 29, 2014

(54) HARDWARE VIRTUALIZATION SYSTEM

(75) Inventors: Davide Tazzari, Arezzo (IT); Filippo Vernia, La Spezia (IT)

(73) Assignee: Power-One Italy S.p.A., Arezzo (IT)

( * ) Notice: Subject to any disclaimer, the term of this patent is extended or adjusted under 35 U.S.C. 154(b) by 825 days.

(21) Appl. No.: 13/060,946

(22) PCT Filed: Aug. 25, 2008

(86) PCT No.: PCT/IT2008/000556
§ 371 (c)(1),
(2), (4) Date: May 16, 2011

(87) PCT Pub. No.: WO2010/023695
PCT Pub. Date: Mar. 4, 2010

(65) Prior Publication Data
US 2011/0271269 A1    Nov. 3, 2011

(51) Int. Cl.
G06F 9/44    (2006.01)
G06F 9/45    (2006.01)
G06F 9/46    (2006.01)
G06F 9/455   (2006.01)

(52) U.S. Cl.
USPC .............. 717/168; 717/139; 717/140; 718/1; 718/104; 719/327

(58) Field of Classification Search
None
See application file for complete search history.

(56) References Cited

U.S. PATENT DOCUMENTS

| 7,516,453 | B1 * | 4/2009 | Bugnion | 718/1 |
| 8,074,218 | B2 * | 12/2011 | Eilam et al. | 718/1 |
| 8,447,936 | B2 * | 5/2013 | Watkins et al. | 711/153 |
| 2005/0155026 | A1 * | 7/2005 | DeWitt et al. | 717/158 |
| 2006/0195848 | A1 * | 8/2006 | Arndt et al. | 718/104 |
| 2007/0074191 | A1 * | 3/2007 | Geisinger | 717/148 |
| 2007/0234295 | A1 * | 10/2007 | Dufour et al. | 717/124 |
| 2007/0283324 | A1 * | 12/2007 | Geisinger | 717/120 |
| 2008/0244595 | A1 * | 10/2008 | Eilam et al. | 718/104 |
| 2009/0113422 | A1 * | 4/2009 | Kani | 718/1 |
| 2009/0217244 | A1 * | 8/2009 | Bozak et al. | 717/124 |
| 2009/0217260 | A1 * | 8/2009 | Gebhart et al. | 717/174 |
| 2009/0241108 | A1 * | 9/2009 | Edwards et al. | 718/1 |
| 2010/0023934 | A1 * | 1/2010 | Sheehan et al. | 717/168 |
| 2010/0023939 | A1 * | 1/2010 | Takahashi | 718/1 |
| 2010/0037207 | A1 * | 2/2010 | Chambers et al. | 717/121 |
| 2011/0023031 | A1 * | 1/2011 | Bonola et al. | 718/1 |
| 2011/0119748 | A1 * | 5/2011 | Edwards et al. | 726/12 |
| 2011/0276741 | A1 * | 11/2011 | Subrahmanyam et al. | 711/6 |
| 2013/0080482 | A1 * | 3/2013 | Berkowitz et al. | 707/803 |
| 2013/0282358 | A1 * | 10/2013 | Clark et al. | 703/22 |
| 2013/0290960 | A1 * | 10/2013 | Astete et al. | 718/1 |

OTHER PUBLICATIONS

Compaq Computer Corporation, et al: "Advanced Configuration and Power Interface Specification (Revision 2.0a)" Internet Citation, [Online] XP008053590 Retrieved from the Internet: URL:http://www.acpi.info/DOWNLOADS/ACPIspec-2-0a.pdf> [retrieved on Oct. 5, 2005] p. 4-p. 5; p. 47-p. 48, p. 130-p. 132.

* cited by examiner

*Primary Examiner* — Insun Kang
(74) *Attorney, Agent, or Firm* — Waddey Patterson; Mark J. Patterson; Gary L. Montle

(57) ABSTRACT

An electronic device comprising at least a motherboard (102) with a digital control unit (101), a plurality of resources (105, 106, 107, 108, 109), and at least one memory support (104) containing a firmware and able to hold an executable program. The firmware is able to carry out a virtualization of the resources of the electronic device, assigning virtual addresses to these resources. The executable program exchanges information or instructions with the electronic device by using these virtual addresses.

25 Claims, 3 Drawing Sheets

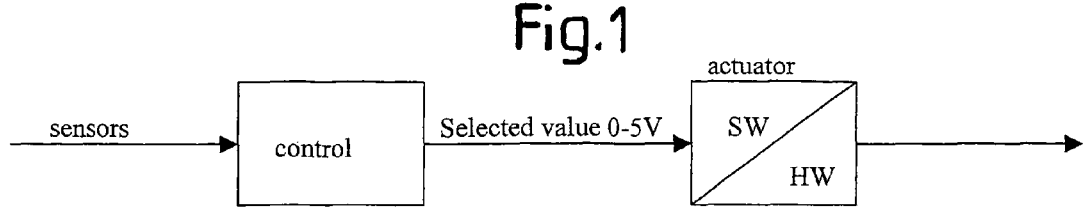
Fig.1
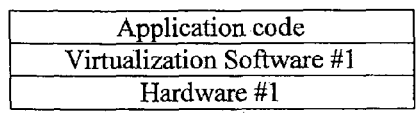
(A)
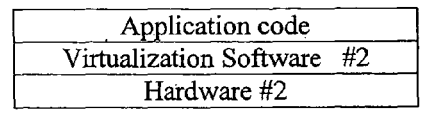
(B)
Fig.2
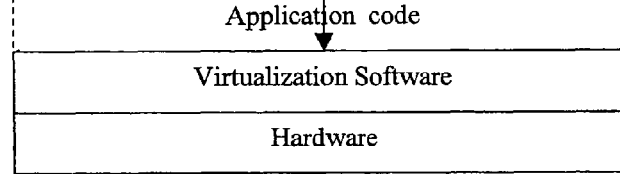
Fig.3A
Fig.3B

← Virtual-Machine

HARDWARE VIRTUALIZATION SYSTEM

TECHNICAL FIELD

The present invention relates to improvements to software-hardware systems, for example, in the field of power supply units and controllers or other embedded electronic devices.

BACKGROUND OF THE INVENTION

Typically, interfacing a large number of devices in a complex infrastructure is a difficult and expensive job. In addition, the manufacturers of electronic devices often send critical components, such as microcontrollers for example, into obsolescence. For a given design, each time a microcontroller is changed, whether one from the same manufacturer is used, perhaps with changed features (I/O, peripherals, RAM, FLASH . . . ), or, above all, when one from another manufacturer is used and therefore with completely different specifications, not only with a hardware redesign of the device becomes necessary, but also a software redesign process, known as porting, is required.

Porting is the process of writing software starting from other, earlier software, so that it can be used on a different hardware platform, to ensure that two apparently different devices (board, microcontroller, layout, components . . . ) appear from the outside as if they were the same.

This complex adaptation process must be performed as quickly as possible because it typically happens in a situation where the device is in full production. In addition, it requires a new and complete sequence of tests to certify the functioning of even the most trivial and recurring functionality.

This approach effectively prevents two or more manufacturing companies from cooperating to develop parts of the design because it would be necessary for them to exchange an excessive amount of information and know-how. On top of this, different companies would also have to align themselves in the checking process for common parts, something that is unacceptable for companies that have their own rigid quality process.

For example, one can assume that two or more companies make different hardware for the same application. In their approach to the solution of the problem, different points of view are used, even profoundly different ones. By way of example, with reference to the diagram in FIG. 1, it is assumed that an analogue signal from 0 to 5 Volt must be generated and driven according to a certain philosophy, which is beyond this explanation, as a function of an input signal arriving from a sensor. It could be assumed that company "A" prefers to generate this signal through the generation of a PWM signal by a microcontroller with low-pass filtering, while company "B" prefers to use an extra, serially-driven chip to generate the same signal. Then, perhaps company "C" prefers to use a different microcontroller that incorporates an internal D/A (digital-analogue) conversion peripheral that is able to generate the signal without additional support hardware. Ignoring the generation method, there is still a need (control chain) that leads to the choice of a particular signal level independently of the way in which it has been generated. The signal generation method disregards the meaning of the signal itself.

In the classical approach, each company will create its own accompanying hardware and software, closely bound to the hardware and microcontroller utilized. The software created will include the part for sensor analysis, "control" and 0-5V output value calculation and the software part for the actuator. If either the sensor part changes, or the "control" philosophy changes, or the hardware part of the actuator changes, all of the software must be rewritten and tested again in its entirety. Moreover, each company must necessarily cope with all parts of the design without being able (or wanting) to cooperate in any way in cases of need or upon request by a customer.

SUMMARY OF THE INVENTION

According to one aspect, the invention proposes a system that allows the above-mentioned drawbacks to be at least partially mitigated.

Essentially, the concept on which the invention is based is that of hardware virtualization, so that the application created does not suffer from changes in the hardware itself. In this way, the creator of the application does not need to pay much attention to changes made at the hardware (or does not need to worry about them all).

This virtualization can be achieved following two methods with two different viewpoints, as shall be explained hereunder.

According to one aspect, the invention concerns an electronic device comprising at least one motherboard with a digital control unit, a plurality of resources, and at least one memory support containing firmware and able to store an executable program. According to the invention, the firmware is able to carry out a virtualization of the electronic device resources, assigning virtual addresses to said resources. In this way, the software supplied with the electronic device (firmware) provides the executable program with a series of virtual addresses that are used by the same executable program, without the need to know the real addresses and thus the real structure of the device hardware. In a first embodiment, the executable program can be obtained from the compilation of a source program written in the same programming language of the microcontroller or another digital control unit of the electronic device. The firmware enables execution of the executable program by the microcontroller or digital control unit by simply associating each virtual address referred to in the program with the corresponding real address of the resource present in the electronic device.

With a configuration of this kind, when the hardware structure changes, it is sufficient for the firmware to be updated in order to provide the virtual addresses associated with the real addresses of the actual hardware structure. The executable application program can run on the new hardware platform, provided it contains the same number of resources or a larger number of resources with respect to the hardware platform or structure for which the executable program was written. The same source program and therefore the same executable program obtained from the compilation of the source program can run on different devices, provided they are equipped with the same microcontroller, as the application program is written in the programming language of the specific microcontroller. Yet apart from this limitation, thanks to the firmware that virtualizes the addresses of the hardware structure, there are no restrictions with regard to the ability of the application software to function on different hardware+firmware structures. This allows the writing of application software to be freed from the design of the hardware structure and its firmware, resolving the above-mentioned problems.

In a second embodiment, the invention also allows the application program to be freed from the type of digital control unit, or microcontroller, allowing an application program to be written that is able to run on any hardware+firmware device or structure, provided it is equipped with the necessary resources. In fact, according to this approach, the application program (in its source program version) is written in its own language, independent from and different to the microcontroller programming language.

The programming language contains instructions created ad hoc for this language and different from those used by the microcontroller. In this way, the same source program, suitably compiled and translated into an executable program, i.e. in a numeric code form, can be executed by different microcontrollers. With this approach, in addition to the normal functions and hardware virtualization, the firmware also performs the interpretation of the executable code. Therefore, on one side it generates a list of virtual addresses that correspond to the real addresses of the resources available on the hardware structure to which the firmware is associated. On the other side, said firmware contains an interpreter, i.e. a program that translates each instruction line of the executable program into a corresponding instruction line in the programming language of the microcontroller, associating each virtual address used in the executable program with the corresponding real address of the hardware device.

It can be appreciated that with an approach of this type, the source program and the corresponding executable program obtained from its compilation are completely freed from the hardware structure of the device on which the application code (executable program) must run, also with regard to the type of microcontroller. If the microcontroller is changed, just the firmware needs to be modified so that the interpreter with which it is equipped can translate the executable program instructions into instructions understood by the new microcontroller. Likewise, if the hardware structure of the device changes, for example, due to the addition or replacement of one or more expansion boards, the firmware must be adapted to contain the new virtual addresses and to give the correspondence between virtual and real addresses of the hardware device. Vice versa, the executable program can remain unchanged, thanks to the fact that it is based on a programming language of its own, and is therefore freed from the microcontroller, and on virtual addresses instead of the real addresses of the hardware system.

To simplify writing a source program that, once compiled, can be executed on a hardware+firmware platform of this type, according to some embodiments, the firmware is able to provide a list of virtual addresses corresponding to the addresses of the resources available on the underlying hardware, in which a name, label or alias is associated with each address that provides the programmer with a clear indication of the nature of the resource to which that address refers.

According to some embodiments, for further simplifying the programming work, the programming language for the application software can provide one or more instructions for assigning to each name, label or alias of the virtual addresses supplied by the firmware, a label, name or alias that is conceptually associable with the function that is carried out by that particular address or resource within the application program.

Further features and embodiments of the invention shall be described hereunder with reference to non-limitative application examples and in the enclosed claims, which form an integral part of the present description.

BRIEF DESCRIPTION OF DRAWINGS

The invention will be better understood by following the description and enclosed drawings, which show practical, non-limitative embodiments of the invention. More in detail:

FIGS. 1, 2A, 2B, 3A and 3B show illustrative diagrams of a first embodiment of the invention.

DETAILED DESCRIPTION OF EMBODIMENTS OF THE INVENTION

Figure 4:
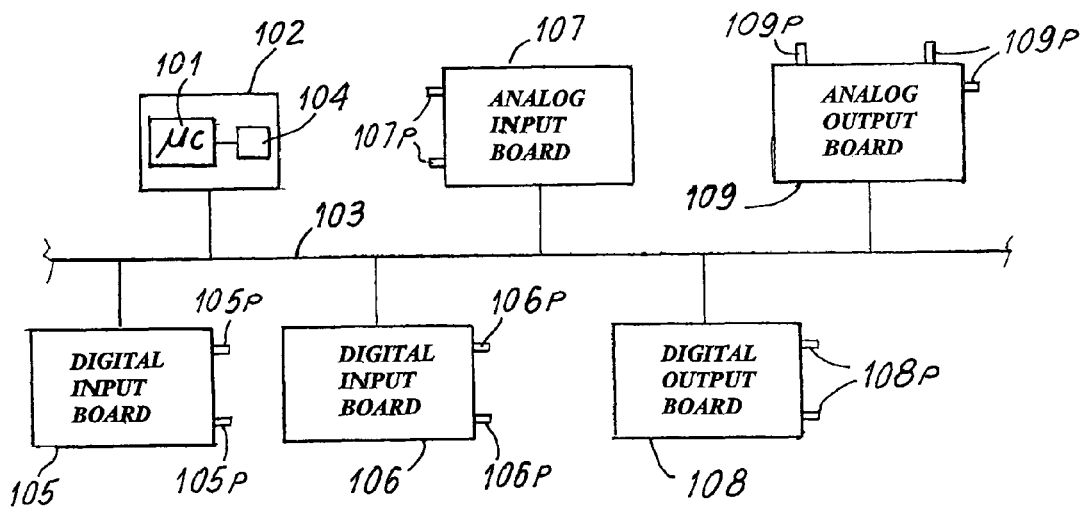
FIG. 4 shows a block diagram of a possible hardware device to which the invention is applied.

According to a first possible embodiment, the invention allows the design of the hardware and writing of the management program (application) for the electronic device to be simplified. By adopting this approach, it is possible to write a single application that can run even on significantly different hardware structures. The only constraint that exists in this embodiment is that the hardware devices use the same microcontroller, as the application is written in the programming language of the microcontroller itself.

In substance, as qualitatively shown in the diagram in FIG. 2, a software layer is created so that the actual application always "sees" the same underlying hardware. In this way, it is possible to arrange that the same application, or rather the same hardware device management program, runs in two different environments with mutually different hardware solutions, united only by the use of the same microcontroller. Two solutions are schematically shown in FIGS. 2(A) and 2(B) that differ with regard to hardware and, in consequence, virtualization software. The same application can work with both systems.

With reference to the example mentioned at the beginning (FIG. 1), the virtualization software can include sensor management and actuator software. The virtualization software makes available output data or signals provided by the sensors, in a format that is independent of the hardware solution utilized. Likewise, the virtualization software can receive input data or signals that are used to drive the actuator and which are generated by the control application, according to the logic applied by the control itself, based on input signals provided by the sensors through the virtualization software.

In this way, different companies can jointly create a design without the need to exchange information on the hardware solutions utilized: company "A" can make hardware and virtualization software #1, company "B" hardware and software #2, while company "C" creates the application that can thus use hardware #1 or #2 indifferently, without needing to care about their differences and specific characteristics. The only information that must be exchanged is the rules and details on the interface between the virtualization software and the application. Obviously, each company that manufactures hardware must necessarily also create its own virtualization software, which must use the same rules.

For example, one can assume having to make a controller for a cooling fan, where the switching on, speed of rotation and switching off are controlled according to a value detected by a temperature sensor. Companies that make the hardware part will each adopt the solution that they consider appropriate with regard to the choice of components and the method of generation of the analogue fan-driving signal. The person who creates the application program will write a program that receives input data that is a function of the detected temperature and provides an output signal based on which, and in function of which, the fan-driving signal will be generated. This application can be created without knowing the details of the hardware and the virtualization software. The person who writes the application program needs only to know the interface details, i.e. he/she must know that an input value is provided by the virtualization software on the basis of the detected temperature and that the virtualization software is designed to receive a signal generated by the application.

In this way, the user can write an application that, for example, drives the fan at two different speeds depending to the temperature, or that only provides for a switching on condition and a switching off condition. Alternatively, the user could rewrite the application, changing the temperature thresholds at which switching on and switching off occur and possibly the fan's upper speed of rotation. In theory, the application could also use a more complex formula that links the received temperature to the fan speed (rpm) so that there are a plurality of speeds and not a limited number.

Any rewriting of the application entails no action on the virtualization software and not even on the hardware structure, and can be carried out by a different subject (company) from the one who made either of the hardware+software virtualization systems. Likewise, different hardware+virtualization software systems can use the same application, as long as the rules and details of the interface with the application are the same.

Another advantage of this embodiment of the invention is that any change made results in a testing phase limited to the portion of software that has been changed. For example, in the case where the control "philosophy" is changed, there is no longer the need to thoroughly test the part for managing the sensors, nor that for signal generation, which are localized in the virtualization software. In addition, porting is also facilitated and speeded up, as with just a hardware change (not of the microcontroller, which must remain the same because the application program is written in the programming language of the microcontroller), it is sufficient to modify and test just the virtualization software. In this way, the application can remain the same.

More advanced and generic features can also be introduced in the virtualization software, such as boot loaders, CRC calculation functions, transmission and reception routines, interrupt virtualization, etc.

Lastly, this approach also proposes a new development model that allows an application to be developed without having access to the actual hardware and to qualify new hardware without having a real application available.

In fact, by creating software on a computer that emulates the real application, it is possible to test the virtualization software and the hardware without the need of having the real application and without even knowing the details thereof. Furthermore, via other software on a computer that emulates the hardware, and therefore emulates the interface rules, it is possible to create and test an application without having the underlying hardware. These two modes of emulation are schematized in FIGS. 3A and 3B respectively.

According to a different embodiment, the invention allows the application to be completely freed from the hardware, allowing an application control program to be created that can run on systems that use different microcontrollers. To that end, it is necessary that the application program be written in a language that is independent of the microcontroller used, i.e. in its own language. The application code, once compiled in a virtual machine language, is read by the virtualization software and translated into microinstructions that can be executed by the microcontroller used. The application program has no need whatsoever to know about the underlying hardware structure.

Through the virtualization software, the application "sees" the same hardware infrastructure independently of the actual hardware and microcontroller utilized. In fact, it would have no idea of the type of hardware and microcontroller used and, in any case, the application program developer has no need to know any details of the hardware structure, not even the type of microcontroller used.

The virtualization software (and its engine, "the virtual machine") can be thought of as the combination of two subsystems: a software layer that allows the microcontroller to interpret the language in which the application code is written and a series of functions (incorporated in a framework) made available to the interpreter and the application itself. If it becomes necessary to modify the hardware, even drastically and including the microcontroller, it will be sufficient to carry out the porting and test just the virtualization software. Finally, if it becomes necessary to modify just the application, there will no longer be any reason to test the functions present in the virtualization software.

The "virtual machine" will present its functions to the application as states, readings and actions, but will not provide any trace of the hardware, or any reference to it.

The manufacturer of the hardware and consequently of the "virtual machine", i.e. the virtualization software, must also create a development environment, inclusive of compiler, assembler and linker, which translates the new virtual language into a binary code that can be correctly interpreted by the virtualization software. Finally, the manufacturer must also provide programming software that allows updating the new application on the microcontroller via the virtualization software.

For a better understanding of the criteria underlying this embodiment of the invention, a particularly simple real-life situation of the type schematized in FIG. 1 is considered: the hardware device comprises a temperature sensor and an actuator for a fan or other member, the operation of which must be controlled according to the detected temperature. For example, one could be dealing with a fan that must be enabled or disabled depending on whether the temperature exceeds a certain maximum value or drops below a certain minimum value. The microcontroller must be programmed to perform this check correctly, receiving temperature input data and providing an output signal for driving the actuator.

The application writer does not how the sensor reading is taken, nor how the output voltage is applied, but must know and implement just the relation between them. For example, a purely indicative code of the following type could be written:

```
input signal Sensor as ThermalSensor
output signal OutputVoltage as AnalogVoltage0_5V
procedure Main( )
if (Sensor < −5 DegC)
    OutputVoltage = 1.0 Volt
elsif (Sensor > 20 DegC)
    OutputVoltage = 4.0 Volt
else
    OutputVoltage =2.5 Volt
end if
end procedure
```

The application applies the following logic: if the temperature detected by the sensor is below −5° C., the analogue output signal is 1.0 V, if the detected temperature is between −5° C. and 20° C., the analogue output signal is 2.5V, and finally, if the detected temperature is above 20° C., the analogue output signal is 4.0V. The virtualization software makes a temperature reading (via the "ThermalSensor" variable input) and an output signal (via the "AnalogVoltage0_5V" variable output) available. When running, the virtualization software will continually handle the reading of the heat sensor and convert the reading into degrees centigrade. At the same time, it will execute the application code that, after having compared the value of this reading with the −5° C. and +20° C. temperature thresholds chosen by the application code writer, will select the voltage that should be applied to the analogue output signal (1.0, 2.5 or 4.0 Volt). Lastly, the same virtualization software will use the value calculated by the application and consequently generate the output signal, driving the available hardware.

As will be understood from the description above, writing the application has nothing to do with the hardware except for the fact that in some way it is able to take a temperature input provided in degrees centigrade and in some other way is able to generate an analogue voltage between 0 and 5 V.

At this point, changing the application is extremely simple and does not affect the virtualization software at all.

The user will write the application using the provided development environment (or possibly with a text editor). The compiler/assembler will perform syntactic and lexical analysis, providing a list of possible errors to the user, after which it will translate the code into machine language interpretable by the virtualization software. Finally, the linker will take care of linking the various resources required by the application (in the example, the "Sensor" and "OutputVoltage" signals) to the real resources made available by the hardware ("ThermalSensor" and "AnalogVoltage0_5V"); for instance, making the virtualization software "understand" that every time the value of the "Sensor" variable is requested, the value of a particular temperature reading that it has read and converted into degrees centigrade is intended. The virtualization software must then be provided with the executable code via a programmer so that it can be used.

This second approach to the concept of virtualization of the hardware structure shall be described in greater detail hereunder, also contemplating a possible programming language.

FIG. 4 schematically shows a hardware system 100 comprising a motherboard 102 with a microcontroller 101, connected via a bus 103 to a series of boards 105-109, which, for example, can be digital and/or analogue input boards and/or digital and analogue output boards and generally any type of board. An example of a generic configuration is shown in the diagram in FIG. 4, on the understanding that the hardware system can comprise a different number of boards and also other types of board.

In general, each board has a plurality of pins, some of which are indicated by way of example as 105P . . . 109P in the diagram in FIG. 4. These boards with the associated input and output pins represent a first part of the resources of the hardware system 100.

The motherboard 102 of the microcontroller 101 has other internal resources, which can consist of inputs or outputs, support variables, timers and so on.

The concept on which the invention is based consists in the virtualization of all the resources of the hardware system, whether of the microcontroller or of the system expansion boards. The firmware stored in the permanent memory 104 of the microcontroller analyzes the available hardware resources and assigns a virtual address to each resource. These virtual addresses will be used, in the manner described further on, in programming the application. The application programmer will not need to know the real structure of the hardware system, it being sufficient to know what types of resources are available and with what label or virtual address each resource is identified. In this way, once a list of the virtual addresses of the resources available on a hardware system has been generated and the application program has been written for this particular system, the same application can be exported to a different hardware system, provided it has an adequate number of resources, i.e. the same hardware resources or a larger number of resources.

A list of virtual addresses corresponding to various "objects" or "resources" available in a generic hardware system is shown below by way of example in List A. The list is generated by the virtualization firmware associated with the hardware:

LIST A

```
// File: HW_Test.FIO
// -----------------------------------------
// Inputs
#input @0x0001 _in_1_1 // SN = 0x00000005, Isolated Input Board
#input @0x0002 _in_1_2 // SN = 0x00000005, Isolated Input Board
#input @0x0003 _in_1_3 // SN = 0x00000005, Isolated Input Board
#input @0x0004 _in_1_4 // SN = 0x00000005, Isolated Input Board
#input @0x0005 _in_1_5 // SN = 0x00000005, Isolated Input Board
#input @0x0006 _in_1_6 // SN = 0x00000005, Isolated Input Board
#input @0x0007 _in_1_7 // SN = 0x00000005, Isolated Input Board
#input @0x0008 _in_1_8 // SN = 0x00000005, Isolated Input Board
// Outputs
#output @0x0011 _out_1_1 // SN = 0x0000000004, Isolated Output Board
#output @0x0012 _out_1_2 // SN = 0x0000000004, Isolated Output Board
#output @0x0013 _out_1_3 // SN = 0x0000000004, Isolated Output Board
#output @0x0014 _out_1_4 // SN = 0x0000000004, Isolated Output Board
#output @0x0015 _out_1_5 // SN = 0x0000000004, Isolated Output Board
#output @0x0016 _out_1_6 // SN = 0x0000000004, Isolated Output Board
#output @0x0017 _out_1_7 // SN = 0x0000000004, Isolated Output Board
#output @0x0018 _out_1_8 // SN = 0x0000000004, Isolated Output Board
// Inputs
#input @0x0021 _in_ana_1_1 // SN = 0x0000000003, Analog Input Board
#input @0x0022 _in_ana_1_2 // SN = 0x0000000003, Analog Input Board
#input @0x0023 _in_ana_1_3 // SN = 0x0000000003, Analog Input Board
#input @0x0024 _in_ana_1_4 // SN = 0x0000000003, Analog Input Board
// Status
#status @0x1000 _status_1 // Voltage Bus (0.1 V - 545 means 54.5 V)
#status @0x1001 _status_2 // General Alarm (0 - Ok, > 0 - Alarm)
#status @0x1002 _status_3 // Overcurrent Alarm (0 - Ok, > 0 - Alarm)
// Timer
```

-continued

LIST A

```
#timer @0x2000 _timer_1
// Variable
#var @0x3000 _var_1
// Controls
#control @0x4006 _control_7 // Minor Alarm Flag (0 - On, 1 - Off)
#control @0x4007 _control_8 // Major Alarm Flag (0 - On, 1 - Off)
#control @0x4009 _control_10 // Led #1 (0 - On, 1 - Off)
#control @0x400A _control_11 // Led #2 (0 - On, 1 - Off)
#banner @0x5000 _ban_1
#banner @0x5001 _ban_2
#log @0x6000 _log_1
#log @0x6001 _log_2
// ----------------------------------------
// End of File
```

There are several sublists of virtual addresses contained in the foregoing list, each address being assigned to a resource available on the hardware system 100. Each virtual address is indicated on a line of the list, with the name assigned to it indicated at the side of the address and followed by a description, after the // symbol (the "//" symbol is used to add comments to the list, as the compiler—which translates high-level language into simpler instructions comprehensible to microcontrollers—normally ignores everything that follows the symbol in question).

More particularly, in the list there is a first group of virtual addresses assigned to the inputs of an input board, the serial number of which is 0x00000005, as indicated in the descriptive part of each line. A brief description of the component containing the object ("isolated input board") is provided next to the serial number of the input board. Examining the first line, on the left is the definition of the type of object ("input"), followed by the virtual address that the firmware assigns to this resource (@0x0001 in the example). The virtual address is followed by a label or alias that is assigned to the virtual address for reasons of greater legibility of the code that will use this address. In the example, this label is _in_1_1. Therefore, with reference to the first line of the above list, the first object or resource that the system makes available and that is virtualized by the firmware assigning it a virtual address, is a digital input of an isolated input board. The following lines indicate the virtual addresses of seven other inputs of the same board.

The second group of virtual addresses on the list is assigned to eight output pins of an isolated digital output board. Using the same logic as already described, each virtual address is tagged with a label or alias that renders its nature more explicit (for example, label "_out_1_1" is assigned to the first address @0x0011).

A list of the virtual addresses assigned to the analogue inputs of an analogue input board follows, these taking values @0x0021 to @0x0024.

With this criterion, it is possible to assign a different virtual address and a respective label to each input and output pin of the various boards available on the system 100.

The next group of virtual addresses is assigned to internal objects or resources of the system to be virtualized. These resources take the name of "status" if they represent inputs made available to the controller and "control" if they represent outputs of the system. In the above example, the first line of the group of virtual addresses named "status" #status @0x1000_status_1 // Voltage Bus (0.1 V—545 means 54.5 V) has the following meaning: virtual address @0x1000, to which label _status_1 is assigned, is assigned to the system input on which a measured voltage is present (for example, the bus voltage). In the description to the right of the // symbol, this is expressed together with information on the scale used to provide the measured voltage (a real example of the measured quantity is also provided: each unit represents a tenth of a volt—if this numeric input assumes a value of 545, this corresponds to a measured voltage of 54.5 V).

Other objects or resources made available in output from the system are virtualized and described with a similar criterion; for example, a general alarm signal at virtual address @0x1001 assigned with label _status_2, and an overcurrent alarm signal assigned with virtual address @0x1002 and label _status_3.

Other virtualized objects or resources are represented by timers (#timer) and support variables (#var).

Internal modifiable objects of the system to be virtualized generally take the name of "control". For example, the following line of the above list #control @0x4006 _control_7 // Minor Alarm Flag (0—On, 1—Off) indicates that virtual address @0x4006 is an internal object on which an alarm flag is present, which can be "0" (alarm present) or "1" (no alarm). Label _control_7 is assigned to this virtual address.

As a rule, the virtualized system disposes of other resources, such as a display for example, to which messages ("banners") can be sent regarding, for example, an alarm or fault condition, or normal operation, or messages concerning the system event log. The latter are indicated with "log".

Other objects can be virtualized with the same criterion. For example, the LEDs of a virtualized system can be identified as:
led @ID label
where @ID is the virtual address identifying the object and label is the label or alias assigned to it.

In general, virtual addresses are assigned in blocks. More precisely, a range of adjacent or consecutive addresses are reserved by the firmware for all the objects of the same category (input, output, status, control, banner, log, led, var, timer, etc.).

By assigning a virtual address to each resource of the hardware system, the application program can be made completely independent of the hardware structure, as it "deals" exclusively with the virtual addresses generated by the firmware, i.e. assigned by the latter to the individual objects of which it is composed or that are made available by the hardware structure. If the hardware structure changes, the manufacturer must simply rewrite the firmware so that it virtualizes the new hardware in a compatible manner, i.e. assigns the same virtual addresses to the same type of object or resource. At this point, the application program written for the first hardware system can also run on the second. This is because the application, as shall be explained further on, only processes the virtual addresses, each of which corresponds to an object of a certain category (e.g. a digital or analogue input of a board, a digital or analogue output of a board, or an internal resource of the virtualized system).

For a given hardware setup, the associated firmware generates a file containing a list of the type shown above in "LIST A", which in reality will be much longer, as it will contain a description of all the hardware resources. This file will be generated upon request by the creator of the application program and will be imported by this program, as described hereunder in greater detail.

An example of application code that can be written using the resources of the hardware system virtualized by the virtualization software is provided below in "LIST B":

LIST B

```
// -- Start declaration zone --
#import HW_Test.FIO
#declare OPEN 0
#declare CLOSE 1
#declare ON 0
#declare OFF 1
#label _in_1_1        Break_Alarm    // External Input
#label _out_1_1       Out_Alarm      // External Output
#label _out_1_2       Out_LVD        // External Output
#label _in_ana_1_1    Vbus           // External Analog Input
                                     (V x 10)
#label _in_ana_1_2    Vac            // External AC Analog Input
                                     (Vrms)
#label _control_led_10  Led_Alarm    // Internal Output Led
#label _control_led_11  Led_LVD      // Internal Output Led
#banner _ban_1 "Alarm Breaker"
banner _ban_2 "LVD Open"
#log _log_1 " Alarm Br "
#log _log_2 " Alarm LV "
# label _ban_1    ban_Alarm_Breaker
# label _ban_2    ban_LVD_Open
#label _log_1    log_Alarm_Breaker
#label _log_2    log_LVD_Open
// -- Start code zone --
procedure Run default
// This procedure is first executed because 'default' key word used
if (Break Alarm == CLOSE) then
    Led_Alarm = OFF
    Out_Alarm = OFF
    Banner_on ban_Alarm_Breaker
    Log_on log_Alarm_Breaker
else
    Led_Alarm = ON
    Out_Alarm = ON
    Banner_off ban_Alarm_Breaker
    Log_off log_Alarm_Breaker
end_if
if (Vbus < 420) then
    Out_LVD = OPEN
    Led_LVD = ON
    Banner_off ban_LVD_Open
    Log_off log_LVD_Open
end_if
if (Vbus > 440) then
  if (Vac > 200) then
        Out_LVD = CLOSE
        Led_LVD = OFF
        Banner_on ban_LVD_Open
        Log_on log_LVD_Open
    end_if
end_if
end_procedure
// End of file
```

The application program shown by way of example in LIST B comprises a first part known as the "declaration zone", in which declarative instructions are contained, which do not perform any operation, but allow the hardware configuration file (represented by way of example in LIST A as: HW_Test.FIO) to be imported and to assign names, i.e. aliases easily read by the programmer, to the addresses and variables that will be used by the program, for easier application program writing and legibility.

More in particular, the so-called declaration zone starts with the following instruction line:
import HW$_{13}$ Test.FIO
which serves to import the file containing the list of virtual addresses, and which in the example shown has, by way of example, the name HW_Test.FIO. In general, the syntax of this command will be:
import <file name>
where <file name> is the name of the file that contains the list of virtual addresses of the hardware.

The next four lines of instructions serve to assign an easily read "name" to the values "0" and "1" that can be taken by flags or state variables inside the application code. In other words, in subsequent instruction lines of the application program, every time an "ON" or "OPEN" value appears, it will be translated to a numeric value of "0", or rather a "low" signal, while every time an "OFF" or "CLOSE" value appears, it will correspond to the value "1" or "high". Therefore, these instructions do not execute any command, but serve to assign readable values to numerical codes. As a rule, these instructions have the following syntactic structure:
declare label value
where <<label>> indicates the label or alias that is assigned to the variable indicated by <<value>>.

The following "#label" instructions have the same purpose and serve to assign a label or alias, having an immediately recognizable meaning for the programmer within the scope of the specific application, to the generic addresses contained in the .FIO file generated by the firmware accompanying the microcontroller and imported by the application program. This phase permits giving greater legibility to the application program listing, as the labels that the firmware associates with the individual (numerical) virtual addresses, although having an immediately perceivable meaning, are in any case unrelated to the specific application and therefore of difficult comprehension. Vice versa, the "label" instructions contained in the declarative zone of the specific application program allow the virtual address to be linked to the specific function that this address is assigned within the scope of the actual application. For example, the following instruction line #label _in__1__1 Break_Alarm // External Input assigns the alias Break_Alarm to virtual address _in__1__1 (corresponding to numerical address @0x0001—see "LIST A"); for the programmer, this indicates a breaker alarm. The line #label _in_ana__1__1 Vbus // External Analog Input (V×10) serves to assign the alias Vbus to generic virtual address _in_ana__ 1__1 (which consists of an analogue input), as the bus voltage is applied to this input. The line #label _control__10 Led-_Alarm // Internal Output Led assigns the alias Led_Alarm to virtual address _control__10, which means that the application uses output _control__10 of the system to be virtualized as a command to switch an alarm LED on or off. The text that follows the // symbol serves only as a comment.

Thus, in general, the "label" instruction has the following syntactic structure:
label old_label label
where <<old_label>> is the name assigned to the virtual address inside the .FIO file, while <<label>> is the new name or alias used for the same address within the scope of the specific application containing the declaration zone under consideration.

The #banner instructions assign a message to "ban_n" type objects. For example:
banner _ban_1 "Alarm Breaker"
banner _ban_2 "LVD Open"
serve to assign messages "No Alarm" and "Alarm #1" to banners "_ban_1" and "_ban_2", available on the system to be virtualized.

In the next part, the list contains the commands of a default sample procedure, which comprises three "if" instructions, which use the "objects" made available by the hardware, loaded via the .FIO file and "renamed" via the aliases defined in the declaration zone. The list is immediately legible thanks to the assignment of the aliases to the individual virtual addresses listed in the .FIO file, which in turn are already designated by clear text names assigned to their numerical values.

The following list (LIST C) shows a simplified version of the application code example in the preceding LIST B, in which the declaration zone and the use of banners and logs have been omitted, and in which the respective command in virtual machine language (hexadecimal notation) is at the side of each instruction line:

| LIST C | |
|---|---|
| if ( | 0x13 |
| Break_Alarm == CLOSE) then | 0x96 0x0001 0x0001 |
| Led_Alarm = OFF | 0x9B 0x3000 0x0001 |
| Out_Alarm = OFF | 0x9B 0x0011 0x0001 |
| else | 0x14 |
| Led_Alarm = ON | 0x9B 0x3000 0x0000 |
| Out_Alarm = ON | 0x9B 0x0010 0x0000 |
| end_if | 0x15 |
| if | 0x13 |
| (Vbus < 420) then | 0x9A 0x0020 420 |
| Out_LVD = Open | 0x9B 0x0011 0x0000 |
| Led_LVD = ON | 0x9B 0x3001 0x0000 |
| end_if | 0x15 |
| if ( | 0x13 |
| Vbus > 440) then | 0x98 0x0020 440 |
| if ( | 0x13 |
| Vac > 200) then | 0x98 0x0030 200 |
| Out_LVD = CLOSE | 0x9B 0x0011 0x0001 |
| Led_LVD = OFF | 0x9B 0x3001 0x0001 |
| end_if | 0x15 |
| end_if | 0x15 |

In the example shown above, the instructions are coded in the following manner:
conditional instructions

| if | 0x13 |
|---|---|
| else | 0x14 |
| end_if | 0x15 | comparative instructions

| operator | comparison of values contained at two addresses | comparison of a value contained at an address with a numeric value |
|---|---|---|
| == | 0x16 | 0x96 |
| >= | 0x17 | 0x97 |
| > | 0x18 | 0x98 |
| <= | 0x19 | 0x99 |
| < | 0x1A | 0x9A |
| <> | 0x1C | 0x9C | assignment instructions:
to assign the value at address ID_2 to address ID_1

| ID_1 = ID_2 | 0x1B |
|---|---|
| ID_1 = numerical value | 0x9B | to assign the value "0" or the value "1" to address ID:

| clear ID | 0x1E |
|---|---|
| set ID | 0x1F |

The way in which the hexadecimal code corresponding to each instruction line is generated (right-hand column of LIST C), is easily understood by considering the codes of the single instructions and the concept of assignment of labels and aliases to virtual addresses.

For example, examining the first two lines of code in LIST C, it can be observed that the first instruction is an "if" conditional instruction, which according to what is indicated in the case herein, is coded with the number 0x13. The second line is a comparative instruction that asks to compare the value of the address known by the alias "Break_Alarm" with the "OPEN" value. Since:
"Break_Alarm" is the alias assigned to coded virtual address "_in_1_1" (address on an external input, defined in the .FIO file that defines the hardware structure—see LIST B),
this coded virtual address corresponds to virtual address @0x0001 (see LIST A),
alias "OPEN" has been assigned to number 0x0000 (see LIST B), and
the comparison operator "==" is coded as 0x96
the following numerical string is obtained

| 0x96 | 0x0001 | 0x0000 |
|---|---|---|
| "compare" | value contained at address 0x0001 | with numeric value 0x0000 |

From the above, it is clear how virtualizing each "object" made available by the hardware structure by means of a suitable firmware, assigning a label to each address of each object that is "comprehensible" to the programmer (LIST A), and then assigning an alias (as defined in the declaration zone of the application) to each address, it is possible to write an application code that remains totally independent of the actual hardware structure. When the latter changes, if necessary, changing also the microcontroller and its programming language, it is sufficient that firmware is available on it that performs the virtualization, providing the .FIO file in output with the definitions of the resources (objects) made available by the hardware. The programmer only needs to check that the virtual addresses used in his/her application program are all available, without worrying about checking exactly what they correspond to, as it is sufficient for the purposes of application program execution that the various addresses functionally correspond (e.g. that an address utilized as an output pin effectively corresponds to an output pin of the new hardware structure).

The criterion described up to here for the virtualization of addresses and writing operating codes independent of the hardware structure can be further improved by providing the possibility to customize a generic executable program at runtime (time of execution) to meet the specific needs of the single user. In practice, it would be possible to choose at runtime which parts of the program to execute based on the client's needs.

In fact, it could be assumed that, for example, the application program is made to provide a series of alarms when certain conditions occur, detected for example by checks on external sensors interfaced with the inputs of one or more boards. A typical example can consist in the management of an electric power supply system, in which it is possible to provide a series of controlled access doors, the unauthorized opening of which triggers an alarm. The application program can be created to control one door, two doors or none, and to provide an alarm when one of the doors is opened.

If a program of this type must be adopted on a system that does not contemplate safety doors, or that provides only one, it is necessary to modify the application software so that it can manage this different system configuration. In the absence of doors, it is necessary to disable the alarms, while in the presence of just one door, control for just that door can be enabled.

To avoid the need of forcing the user to ask for three customized versions of the application program, a new family of "objects" could be provided, which serve to condition the behavior of the program according to the user's needs. Alternatively, the customer should be instructed on how to disable alarms by cabling additional connections to the inputs of the alarm sensors to render them inactive.

In substance, with this new family of objects, the programmer is allowed to associate a conditioned object (slave) with any resource, i.e. any object of the virtualized system (hereunder also indicated as "conditioning object: master"). Several outputs are associated with each conditioned object (slave) that the user can customize. Each conditioning object can be any object of the virtualized system, with the only condition being that it must only assume two states: 0 or 1, ("true" or "false").

Two instructions are provided for managing this family of objects. The first instruction connects a conditioning object (master) with a conditioned object (slave) and has the following generic syntax:
action_ID_j ID_master_i ID_banner_j
where
ID_action_j is a generic ($j^{th}$) conditioned object with a conditioned action. In the application example that is illustrated hereafter, 32 conditioned actions (therefore $j=0 \ldots 31$) will be provided. For example, it could be an alarm.
ID_master_i is a generic ($i^{th}$) object of the virtualized system, which conditions the behavior of the corresponding slave object (action_j). For example, it could be a signal (which can be set alternatively to "0" or "1") of a sensor that detects the opening or closing of an access door, or a failure signal for a component of the system, or even an inefficiency signal for the battery of an uninterruptible power supply.
ID_banner_j is a message string that appears on a user interface (monitor) to provide the user with a clear text description of the $j^{th}$ action ($j^{th}$ object). For example, it could indicate that the $j^{th}$ action is an "alarm", or failure of a certain component of the system.

The master>slave association allows a signal (an alarm for instance) coming from the program to be "propagated" to another object and to decide at runtime whether or not this association is active. In this way, the user can activate parts of the program by simply enabling the association, or deactivate them by disabling the association. Each slave input can in turn propagate its value to a series of outputs (defined in the program) that can be enabled or disabled at runtime. In this way, the user can decide which outputs to activate in function of the various alarms.

The second instruction, which has this specific purpose, has the following generic syntax:
action output k ID_out_k ID_banner_k
where
k indicates one of the outputs available for being conditioned. In the example, there are seven, but the number is simply by way of example.
ID_out_k indicates a generic $k^{th}$ conditioned object on which all the slave objects converge, following a rule that will be described further on. In an illustrative example that will be discussed hereunder, seven possible outputs will be provided for each action or conditioned object, and therefore $k=0 \ldots 6$.
ID_banner_k is a message string that appears on a user interface (monitor) to provide the user with a clear text description of the $k^{th}$ conditioned object.
Each conditioning object (ID_master_i) can be enabled or disabled by the user to propagate its value to the conditioned object (ID_action_j) that, in turn, can propagate its value to one or more output objects, each corresponding to one of the seven ID_out_k. In this way, for each of the 32 conditioned objects, there are a corresponding seven possible outputs, that is for an input that can alternatively assume two values (0 or 1, i.e. "false" or "true") there can be one or more outputs, up to a maximum of seven outputs. Each enabled output assumes the value of the conditioned object. The output object has a value of 1 if at least one of the enabled objects that condition it has a value of 1. Otherwise, its value is 0.

If an instruction string containing one of the ID_action_j conditioned objects appears in the application, the interpreter loads a corresponding string of eight values or bits from memory, which can be modified by the user at runtime. The first is an enable bit (i.e. propagates the value of the ID_master_i object to the object in question). If this bit is "0" the object to be conditioned (ID_action_j) is set to "0" whatever its current value. In the enable bit is "1", the object to be conditioned (ID_object_j) assumes the value of the master object (ID_master_i).

The following example clarifies the functioning of this type of instruction. Table 1 shows a possible configuration of objects to condition and conditioned outputs:

TABLE 1

| Conditioning object (ID_master) | Enab. | Slave object (ID_action) | Flag 0 | Flag 1 | Flag 2 | Flag 3 | Flag 4 | Flag 5 | Flag 6 |
|---|---|---|---|---|---|---|---|---|---|
| ID_master_0 | 1 | ID_master_0 | 0 | 1 | 0 | 0 | 1 | 1 | 0 |
| ID_master_1 | 0 | 0 | 1 | 0 | 0 | 1 | 0 | 1 | 0 |
| ID_master_2 | 0 | 0 | 0 | 0 | 0 | 0 | 1 | 1 | 0 |
| ... | ... | ... | ... | ... | ... | ... | ... | ... | ... |
| ID_master_31 | 1 | ID_master_31 | 0 | 1 | 1 | 0 | 0 | 0 | 1 |
| — | | | ID_out0 | ID_out1 | ID_out2 | ID_out3 | ID_out4 | ID_out5 | ID_out6 |

Thirty-two conditioning "actions" are indicated in the first column to the left, with the conditioned objects in the third column. Each one of them is defined in the application code via an instruction of the type action ID_action_j ID_master_i ID_banner_j which means that each time the object identified by ID_master_i appears in the application program, the line corresponding to ID_action_j is called up. The user selects which object to pair with the single conditioned action via the above-indicated instruction.

Enable/disable flags that enable or disable the conditioned action are contained in the second column, while the remaining columns contain flags that enable/disable the single conditioned outputs, which are defined by the following instructions:

| | |
|---|---|
| #action_output 0 ID_00 | ID_banner_out_0 |
| #action_output 1 ID_01 | ID_banner_out_1 |
| #action_output 2 ID_02 | ID_banner_out_2 |
| #action_output 3 ID_03 | ID_banner_out_3 |
| #action_output 4 ID_04 | ID_banner_out_4 |
| #action_output 5 ID_05 | ID_banner_out_5 |
| #action_output 6 ID_06 | ID_banner_out_6 | where ID_banner_out_j (J=0 . . . 6) is the text of the message that appears on the user interface to describe the corresponding output in clear text. The user can select the seven conditioned outputs via the above-stated instructions. Therefore, selecting the values of the "Enable" and Flag_j flags can condition the behavior of the program.

For example, with reference to Table 1, the generic conditioning action ID_master_0 has been enabled, which means that every time the object associated with ID_master_0 appears in the application program, its value is transmitted to object ID_action_0: if it is "0", it remains "0", while if it is "1", it remains "1". It then commands all the outputs ID_out_j for which the respective enable flag is set to "1", which in the example provided are those corresponding to positions 1 (Flag 1), 4 and 5, namely ID_out01, ID_out04 and ID_out05. These outputs will assume the value of the object to be conditioned, i.e. the object associated with conditioned action ID_action_0. The remaining outputs will remain at "0".

Vice versa, the value of the object associated with conditioned action ID_action_1 is set to "0", whatever the value of conditioning object ID_master_1, because the enable flag associated with this conditioned action is "0". Consequently, all conditioned outputs are set to "0". And so on.

Figure 5:
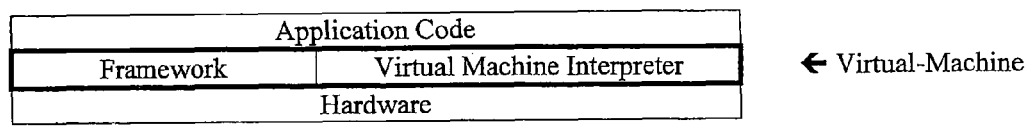
FIG. 5 shows virtual machine configuration of the present invention.
Figure 6:
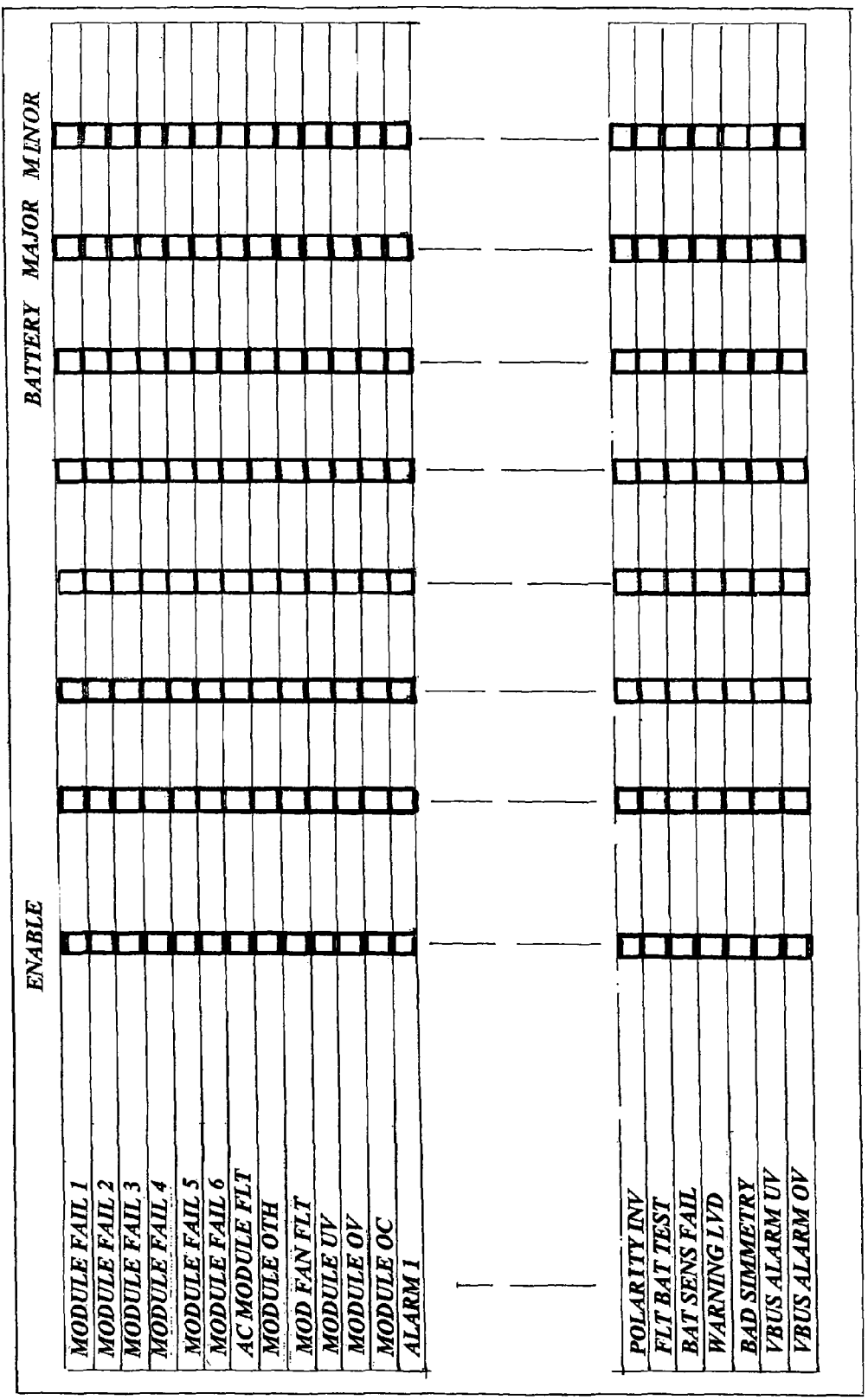
FIG. 6 shows a graphical interface for runtime programming of the application by the user.

To allow immediate customization of the application program, a programming user interface could be provided shown in FIG. 6, which could assume the configuration shown in FIG. 5, where the single boxes can be ticked or left blank and correspond to the enable flags described with reference to Table 1. Each tick in a box corresponds to a value of "1" for the respective flag, while each empty box corresponds to a value of "0". The table contains 32 rows and 8 columns, corresponding to the thirty-two conditioned actions and the seven outputs (+enabling flag). Each j.sup.th row is identified by the ID_banner_j message that appears in the respective instruction string #action ID_action_j ID_master_i ID_banner_j while each k.sup.-th column (except for the "enable" one) is identified by the ID_banner_out_k message that appears in the respective string #action_output k ID_out_k ID_banner_out_k.

In substance, the user can thus define the corresponding eight-bit string that determines the seven conditioned outputs paired to each object to be conditioned for each of the 32 interface rows (which correspond to 32 objects to be conditioned). This information is saved in a non-volatile memory so that it is immediately available at each start-up of the machine and can be modified by the user as desired.

It is understood that what is described above and represented in the enclosed drawings is exclusively a possible embodiment of invention, which may vary in forms and arrangements without however departing from the scope of the concept on which the finding is based, as defined in particular in the following claims.

The invention claimed is:

1. An electronic device comprising: a motherboard having a digital control unit; a plurality of hardware resources coupled to the motherboard via a bus and each comprising a real address associated with the device; at least one memory unit containing a firmware and configured to store a source program, said firmware configured to assign virtual addresses to the hardware resources of the electronic device, compile the source program to generate an executable program and having instructions readable by the digital control unit, associate the virtual addresses referred to in said executable program with corresponding real addresses, said executable program further configured to associate a conditioned object with a virtualized resource, and said conditioned object is associated with a string of flags corresponding to a respective plurality of conditioned outputs; and update said virtualized resource and said compilation for the executable program in response to changes in either of the hardware resources or the digital control unit: and a programming user interface configured to receive a plurality of user inputs, the executable program configured at the time of execution to enable and disable said conditioned object, and to set and modify said associated string of flags, in accordance with said user inputs.

2. The device of claim 1, further comprising one or more additional motherboards with respective hardware resources coupled to the motherboard via the bus, said firmware assigning corresponding virtual addresses to the hardware resources of said additional motherboards.

3. The device of claim 2, wherein said executable program is written in the same programming language of the digital control unit of said device.

4. The device of claim 2, wherein said executable program is written in a different programming language from the programming language of the digital control unit of the device and wherein said firmware contains an interpreter to interpret the programming language of the executable program and to allow execution thereof by the digital control unit.

5. The device of claim 1, wherein said firmware is configured to provide a list of the virtual addresses assigned to the hardware resources of said device.

6. The device of claim 5, wherein said executable program is written in the same programming language of the digital control unit of said device.

7. The device of claim 5, wherein said executable program is written in a different programming language from the programming language of the digital control unit of the device and wherein said firmware contains an interpreter to interpret the programming language of the executable program and to allow execution thereof by the digital control unit.

8. The device of claim 1, wherein said firmware is able to provide a list of the virtual addresses assigned to the resources of said device, said executable program configured to associate conditioned objects with said virtual addresses via said list and independent of direct communication with the hardware resources.

9. The device of claim 8, wherein aliases are assigned to said virtual addresses, said aliases configured to define the nature of the virtualized resource to which said virtual addresses are assigned.

10. The device of claim 9, wherein descriptions are assigned to said virtual addresses regarding the virtualized resource to which the respective virtual address refers.

11. The device of claim 10, wherein said descriptions comprise a serial number of the board holding the virtualized resource to which the respective virtual address is assigned.

12. The device of claim 1, wherein said executable program is written in the same programming language as the digital control unit of said device.

13. The device of claim 1, wherein said executable program is written in a different programming language from the programming language of the digital control unit of the device and wherein said firmware contains an interpreter to interpret the programming language of the executable program and to allow execution thereof by the digital control unit.

14. The device of claim 13, wherein said firmware provides a file containing a list of virtual addresses, each corresponding to a real resource of said device, said file constituting a virtual representation of the electronic device.

15. The device of claim 14, wherein said executable program contains instructions that use commands of a different programming language from the programming language of the digital control unit and virtual addresses provided by said firmware, and wherein the firmware interpreter translates each instruction of the executable program into a corresponding instruction in the programming language of the digital control unit and associates a corresponding real address of said device to each virtual address.

16. A method for management of an electronic device via associated firmware and an executable program, said electronic device comprising at least one motherboard with a digital control unit and a plurality of hardware resources, said method comprising: assigning respective virtual addresses to the hardware resources of said electronic device; providing said virtual addresses to said executable program generated from compilation of a source program contained in the firmware; providing correspondence between the virtual addresses and real addresses of the resources of the electronic device to be obtained; associating a conditioned object with a virtualized resource by the executable program, said conditioned object associated with a string of flags further associated with respective virtual addresses of a plurality of conditioned outputs; customizing the executable program at the time of execution, said customization comprising enabling or disabling of the conditioned object, and setting and modifying of the string of flags in accordance with user inputs provided via a programming user interface.

17. The method of claim 16, wherein said executable program is written in the same programming language of said digital control unit, and wherein via firmware of said electronic device a real address of said electronic device is associated with each virtual address used by the executable program.

18. The method of claim 16, wherein said executable program is written in a different programming language from the programming language of the digital control unit and wherein the instructions of said executable program are interpreted into the programming language of said digital control unit by said firmware.

19. The method of claim 18, wherein said executable program is obtained from the compilation of the source program written in a different programming language from the programming language of said digital control unit of the electronic device, and wherein the source program comprises a declarative part in which an alias is associated with each virtual address used in the source program that identifies the function of the virtualized resource corresponding to said virtual addresses within said source program.

20. The method of claim 16, comprising the step of generating for said electronic device a file containing the virtual addresses assigned to the hardware resources of the device, said file constituting a virtual representation of the electronic device.

21. The method of claim 20, wherein said executable program is written in the same programming language of said digital control unit, and wherein via the firmware of said electronic device a real address of said electronic device is associated with each virtual address used by the executable program.

22. The method of claim 20, wherein said executable program is written in a different programming language from the programming language of the digital control unit and wherein instructions of said executable program are interpreted into the programming language of said digital control unit by said firmware.

23. The method of claim 20, comprising the step of associating a label to each virtual address that is correlated to the nature of the virtualized resource to which said virtual address is assigned.

24. The method of claim 23, wherein said executable program is written in the same programming language of said digital control unit, and wherein via the firmware of said electronic device a real address of said electronic device is associated with each virtual address used by the executable program.

25. The method of claim 23, wherein said executable program is written in a different programming language from the programming language of the digital control unit and wherein instructions of said executable program are interpreted into the programming language of said digital control unit by said firmware.

* * * * *